United States Patent [19]
Zivkovic

[11] Patent Number: 5,395,176
[45] Date of Patent: Mar. 7, 1995

[54] BALL JOINT FOR PARTS OF THE STEERING OR WHEEL SUSPENSION OF MOTOR VEHICLES

[75] Inventor: Milorad Zivkovic, Filderstadt, Germany

[73] Assignee: Mercedes-Benz AG, Germany

[21] Appl. No.: 42,647

[22] Filed: Apr. 5, 1993

[30] Foreign Application Priority Data

Apr. 9, 1992 [DE] Germany .................. 42 11 897.2

[51] Int. Cl.$^6$ .................. F16C 11/00; F16D 1/12
[52] U.S. Cl. .................. 403/122; 403/133; 403/135; 403/137; 403/141
[58] Field of Search .............. 403/133, 135, 137, 140, 403/122, 139, 141

[56] References Cited

U.S. PATENT DOCUMENTS

| | | | |
|---|---|---|---|
| 3,073,634 | 1/1963 | Gottschald | 403/139 |
| 3,233,929 | 2/1966 | Herbenar | 403/140 |
| 3,530,495 | 9/1970 | Kindel | 403/140 |
| 3,560,035 | 2/1971 | Kindel | 403/140 |
| 3,578,366 | 5/1971 | Snidar | 403/140 |
| 3,787,127 | 1/1974 | Cutler | 403/133 |
| 3,909,084 | 9/1975 | Snidar et al. | 403/135 |
| 4,318,627 | 3/1982 | Morin | 403/133 |
| 4,511,277 | 4/1985 | McCabe | 403/140 |
| 4,615,638 | 10/1986 | Ito | 403/135 |
| 4,993,863 | 2/1991 | Inoue | 403/133 |
| 4,995,755 | 2/1991 | Hyodo et al. | 403/137 |
| 5,067,841 | 11/1991 | Fukukawa et al. | 403/135 |
| 5,188,477 | 2/1993 | Idosako et al. | 403/133 |

FOREIGN PATENT DOCUMENTS

| | | | |
|---|---|---|---|
| 0145869 | 6/1985 | European Pat. Off. . | |
| 0342351 | 4/1989 | European Pat. Off. . | |
| 1244082 | 9/1960 | France | 403/135 |
| 32497 | 12/1955 | Germany . | |
| 1057833 | 5/1959 | Germany . | |
| 1260236 | 2/1968 | Germany . | |
| 1294105 | 4/1969 | Germany . | |
| 1907215 | 7/1973 | Germany . | |
| 2235874 | 6/1975 | Germany . | |
| 2709084 | 9/1977 | Germany | 403/135 |
| 3828683 | 3/1990 | Germany . | |
| 4032541 | 4/1992 | Germany . | |
| 9204269 U | 7/1992 | Germany . | |
| 575636 | 4/1958 | Italy | 403/140 |
| 64-30914 | 2/1989 | Japan | 403/140 |
| 1-116314 | 5/1989 | Japan | 403/137 |
| 5-157112 | 6/1993 | Japan | 403/135 |
| 165315 | 11/1958 | Sweden | 403/135 |
| 1475439 | 6/1977 | United Kingdom . | |
| 1485365 | 9/1977 | United Kingdom | 403/135 |
| 2104590 | 3/1983 | United Kingdom . | |
| 2151297 | 7/1985 | United Kingdom | 403/141 |
| 2170265 | 7/1986 | United Kingdom . | |
| 637562 | 12/1978 | U.S.S.R. | 403/135 |

Primary Examiner—Richard A. Bertsch
Assistant Examiner—Howard R. Richman
Attorney, Agent, or Firm—Evenson, McKeown, Edwards & Lenahan

[57] ABSTRACT

A ball joint has a joint pin with a spherical head received by a bearing shell arranged in the joint housing. Notwithstanding bearing-shell wear which occurs, the radial guidance of the spherical head in the bearing shell remains largely constant over the lifetime of the ball joint. For that purpose, the bearing shell, through which passes a slot extending transversely relative to the circumferential direction, bears with a cylindrical part of its circumferential surface against a cylindrical wall portion of the joint housing and is radially prestressed relative to the axis of the cylindrical wall portion between the joint housing and the equatorial diameter of the spherical head.

13 Claims, 3 Drawing Sheets

BALL JOINT FOR PARTS OF THE STEERING OR WHEEL SUSPENSION OF MOTOR VEHICLES

BACKGROUND AND SUMMARY OF THE INVENTION

The present invention relates to a ball joint for parts of a motor vehicle steering or wheel suspension and, more particularly, to a ball joint comprising a radially flexible bearing shell consisting of plastic material, a joint pin having a spherical head configured to be received in the bearing shell and retained with an outer circumference thereof in a recess of a joint housing, a cylindrical portion of circumferential surfaces of the bearing shell sized and configured to bear against a cylindrical wall portion of the recess, the bearing shell enclosing the spherical head beyond an equatorial diameter thereof located within the cylindrical wall portion, and a retaining member inserted into the recess and securing the bearing shell with prestress in the recess.

A known ball joint is disclosed in German Patent No. 2,235,874 in which a bearing shell, starting from the shell edge, is provided with slots which are provided at equal angular distances from one another and extend along a respective generatrix and the length of which corresponds essentially to the axial length of the cylindrical part of the shell circumference or to half the axial length of the bearing shell. This permits the plastic bearing shell enclosing the spherical head of the joint pin beyond its equatorial diameter to be attached onto the spherical head.

The bearing shell is fixed in the housing recess by a slotted spring ring forming a retaining member. This spring ring is seated in an annular groove put into the inner wall of the housing recess, is supported on the bearing-shell end face interrupted by the slots and thereby exerts an axially directed pressing force in the main load direction of the ball joint, i.e. in the direction of the bottom of the housing recess, on the legs of the bearing shell which are formed by the shell slots.

Under the effect of this pressing force, the shell legs experience a compressive load. As a result, the shell legs are deformed and are in surface contact with the outer surface of the spherical head in particular regions only due to tolerances present between the faces of the ball casing, the bearing legs and the cylindrical wall portion of the housing recess. The result of this is that, in spite of the pressing force exerted permanently on the bearing shell by the spring ring, the radial play between the spherical head and bearing shell caused by their wear increases over the service life of the ball joint and consequently high fluctuations at the moment of friction are unavoidable. This impairs, for instance, the vibrational decoupling via transverse-link rubber bearings, in that, in a ball joint used, for example, as a supporting joint, the coupling between a wheel carrier and a transverse link is correspondingly reduced as a result of the decreasing moment of friction.

As a further consequence of the pressing force exerted on the bearing shell, the spherical head of the joint pin is clamped in the bearing shell such that a breakaway moment has to be overcome in order to pivot it.

UK Patent No. 2,104,590 A discloses a ball joint having a radially slotted bearing shell which receives the spherical head and which is arranged coaxially with a cylindrical part of the circumferential surface in a cylindrical recess of the joint housing formed by a sheet-metal sleeve. Formed onto the bearing shell on both sides of the cylindrical part of the circumferential surface are conical circumferential-surface parts, of which one bears against an elastic sealing ring and the other against an elastic thrust ring.

In the assembled state, the sealing ring is supported on an inner flange of the sheet-metal sleeve, while a closing cover crimped into the sheet-metal sleeve is supported on the thrust ring. Also, a radial distance is provided between the cylindrical circumferential-surface part of the bearing shell and the inner circumference of the sheet-metal sleeve. When the closing cover is being crimped in, the bearing shell therefore cannot be prestressed in a specific way in the radial direction, since the material of the thrust ring and sealing ring creeps.

An object on which the present invention is based is to improve a ball joint of the aforementioned type such that the radial guidance of the spherical head in the bearing shell remains largely constant in the main load direction of the ball joint over its service life and that a desired moment of friction can be applied to the spherical head.

This object has been achieved according to the present invention by providing that the bearing shell has a slot passing therethrough and extending transversely relative to the circumferential direction, wherein the bearing shell is radially prestressed relative to an axis of the cylindrical wall portion between cylindrical wall portion in the recess and the equatorial diameter of the spherical head.

The configuration and arrangement of the bearing shell according to the present invention guarantee that, due to its radial prestress, the bearing shell bears constantly against the spherical head of the joint pin in a play-free manner.

A displacement of the spherical head within the bearing shell, brought about by shell wear which occurs, can now take place only coaxially relative to the cylindrical edge portion located on the housing side as a result of the radial prestress of the bearing shell between the cylindrical wall portion in the housing recess and the equatorial diameter of the spherical head. However, the initially set moment of friction between the equatorial diameter of the spherical head and the bearing shell thereby remains largely constant.

Another feature of the present invention affords the advantage that, in the event of abrasion of the bearing shell in the main load direction of the ball joint, the inner annular edge, supporting the spherical head, of the shell orifice narrowing conically inwards experiences wear, thus leading to an increase in the diameter of the shell orifice, but at the same time to a reduction of the surface pressure in the orifice region of the latter. Moreover, this features also offers the advantage that a desired trend of the moment of friction can be determined for the ball joint in relation to the bearing-shell wear, for which purpose the conicity of the bearing-shell orifice is to be determined arithmetically.

Another feature of the present invention affords the advantage that the bearing shell previously already prestressed in a specific way in the radial direction, together with the spherical head received by the latter, and, having been preassembled complete in the flanged bush, can be inserted into the recess of the joint housing. The only further operation remaining is to crimp the housing collar so as to fix the flanged bush receiving the bearing shell firmly to the housing.

Further features of the present invention afford the advantage that the casing portions of the bearing shell, which enclose the spherical head, but which are not received with radial prestress by the flanged bush, are nevertheless kept in contact with the casing of the spherical head in a gap-free manner. The same effect is achieved in another embodiment of the present invention such that the annular collar of the flanged bush is capable of being used at the same time for an advantageous sealing of the joint housing at the exit point of the joint pin.

In a further embodiment of the present invention, the parts of the flanged bush engaging over the spherical head and the annular collar consist of plastic, with the result that the weight of the flanged bush can be reduced.

Yet still another embodiment of the present invention has the advantage that the bearing shell has to be introduced only with its cylindrical circumferential-surface part into the flanged bush, with the elastically flexible retaining segments of its plastic shaped body at the same time enclosing the spherical head over a further circumferential region. Also, a reliable securing of the joint pin against coming loose from the joint housing can be achieved in a simple way.

BRIEF DESCRIPTION OF THE DRAWINGS

These and other objects, features and advantages of the present invention will become more readily apparent from the following detailed description of several embodiments when taken in conjunction with the accompanying drawings wherein.

DETAILED DESCRIPTION OF THE DRAWINGS

Figure 1:
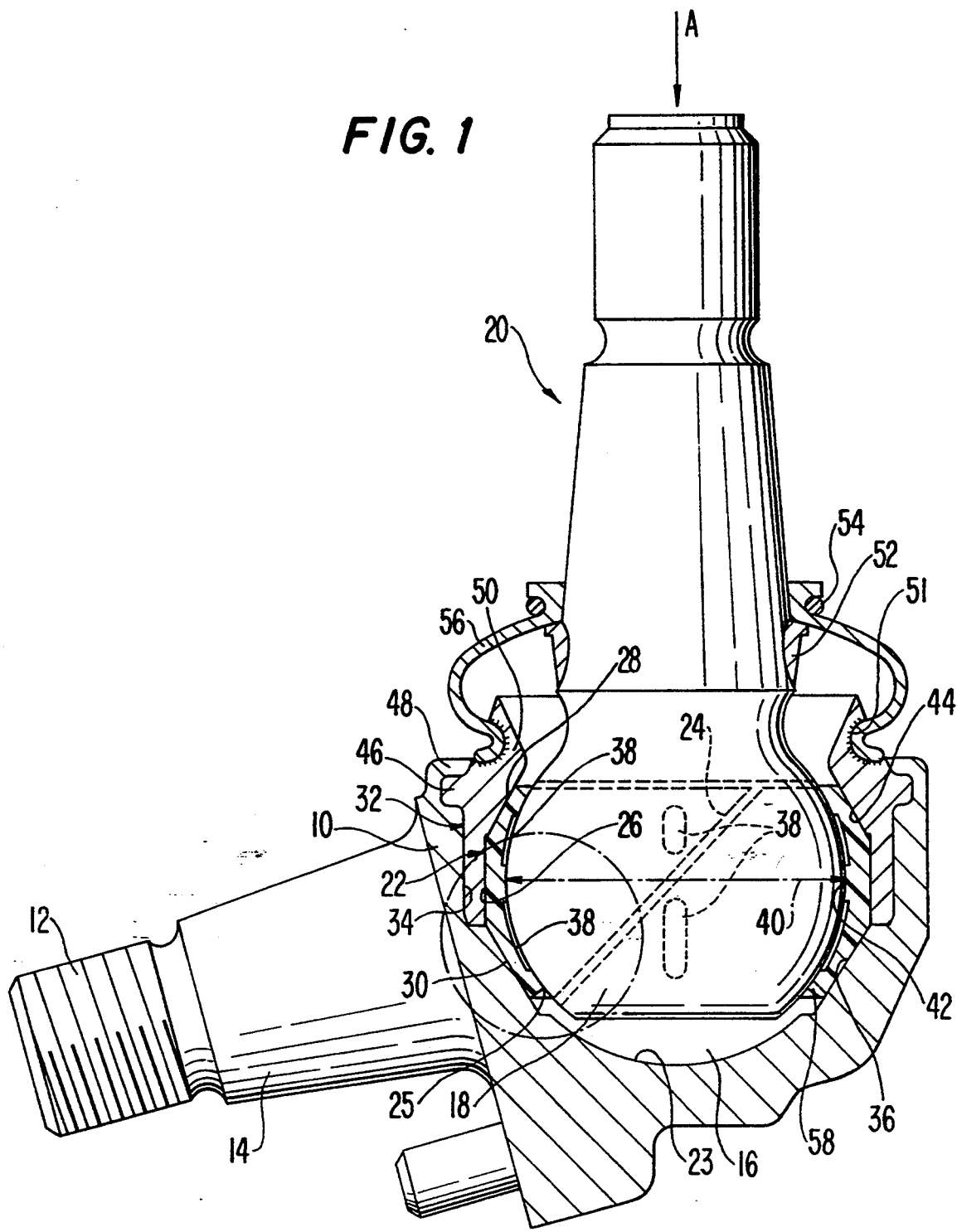
FIG. 1 is a longitudinal partial sectional view through a ball Joint in accordance with the present invention.

The ball joint shown in FIG. 1 is configured as, for example, a supporting joint for a vehicle wheel carrier and has an internally cup-like joint housing 10 with a connecting cone 14 which is formed thereon and carries a threaded shank 12. By way of the shank 12, the joint housing 10 can be fastened by bracing or the like in a complementarily conical receiving orifice of a conventional wheel carrier.

A spherical head 18 of a joint pin 20 is held movably in a housing recess 16. For the purpose of a wobblable arrangement of the joint pin 20, the spherical head 18 is mounted in a play-free manner in a bearing shell 22 which has been injection-molded from slidable plastic. A slot 24 opens out on the end faces of this bearing shell 22 and passes therethrough. In its wall region facing the bottom 23 of the housing recess 16, the bearing shell 22 preferably has an orifice 25 of relatively large diameter which narrows conically inwardly and into which the spherical head 18 engages. Furthermore, the outside of the bearing shell 22 has a central cylindrical circumferential portion 26 and conically narrowing circumferential portions 28, 30 adjoining the central portion on each side.

By way of the circumferential portions 26, 28, the bearing shell 22 is received by a flanged bush 32 which preferably consists of steel and which is itself held with a press fit in a cylindrical wall portion 34 of the housing recess 16.

The bearing shell 22 is supported by its conical circumferential portion 30 on a complementary annular supporting face 36 of the housing recess 16. It possesses pocket-like depressions 38 distributed over the inner circumference of the shell for receiving a lubricant. The depressions are so arranged that, in the constructional position of the joint pin 20 (FIG. 1), they are located on both sides of the equatorial diameter 40 of the spherical head. As is evident from FIG. 1, there remains between the upper and lower depressions 38 on the inner circumference of the shell a circumferentially closed annular bearing face 42 which is separated only by the slot 24 and which extends symmetrically transversely relative to the equatorial diameter 40 of the spherical head. The bearing shell 22 is also supported by the conical circumferential portion 28 on a complementary conical inner circumferential-surface part 44 of the flanged bush 32.

The flanged bush 32 has an outer flange 46 which, after it has been installed in the joint housing 10, is located within a housing collar 48 which is laid against the outer flange 46 by partial crimping in order to fix the flanged bush 32.

An annular collar 50 is preferably formed onto the flanged bush 32 and projects above the crimped housing collar 48 with an inner surface widening conically outwardly above the outwardly conically narrowing inner circumferential-surface part 44 of the flanged bush 32 in order to achieve a desired bending angle of the joint pin 20. The annular collar 50 affords the possibility of an advantageous sealing of the joint housing 10. For this purpose, for example, there is formed into the outer circumference of the annular collar 50 an annular groove 51 of preferably concave cross-section. A sealing sleeve 56 is vulcanized into the annular groove 51 and is slipped onto the joint pin 20. The sleeve 56 is supported on a plastic support ring 52 attached thereon and held sealingly by a clamping ring 54. As a result of the vulcanizing in, there is no need for a clamping ring, and thus the risk of injury during the mounting of the latter can be avoided. With regard to FIG. 1, the joint pin 20 can also be guided out of the housing bottom 23. In that instance, the flanged bush 32 is not provided with an annular collar.

Corresponding diametral dimensions of the spherical head 18, bearing shell 22 and flanged bush 32 are coordinated with one another such that, in the region of the equatorial diameter 40 of the spherical head 18, the bearing shell 22 is held between the spherical head 18 and the flanged bush 32 with a radial bracing which determines a desired moment of friction and which is preferably selected so that the Joint pin 20 can be pivoted without any breakaway moment.

The radially flexible configuration of the bearing shell 22 via the slot 24, which can, for example, extend along a generatrix or, as shown, obliquely relative thereto, ensures that, with the prestressed bearing shell 22 as mounted, the spherical head 18 is also enclosed in a gap-free manner or positively by its circumferential portions 28, 30 conically narrowed on the outside. Because the bearing shell 22 is slotted, there is no need for special tolerance requirements during its production.

When wear of the bearing shell 22 occurs, the joint pin 20 is displaced in the main load direction of the ball joint in the direction of arrow A. The spherical head 18 penetrates correspondingly deeper into the bearing-shell orifice 25 and narrows conically inwards. Also, as a result of the radially prestressed bearing shell 22, the spherical head 18 can be displaced with its equatorial diameter 40 relative to the bearing face 42 of the bearing shell 22 solely coaxially relative to the cylindrical circumferential portion 26 of the flanged bush 32. The conical supporting face 36 of the housing recess 16 prevents a gap from forming between the housing recess 16 and the circumferential-surface portion 30 of the bearing shell 22.

Figure 2:
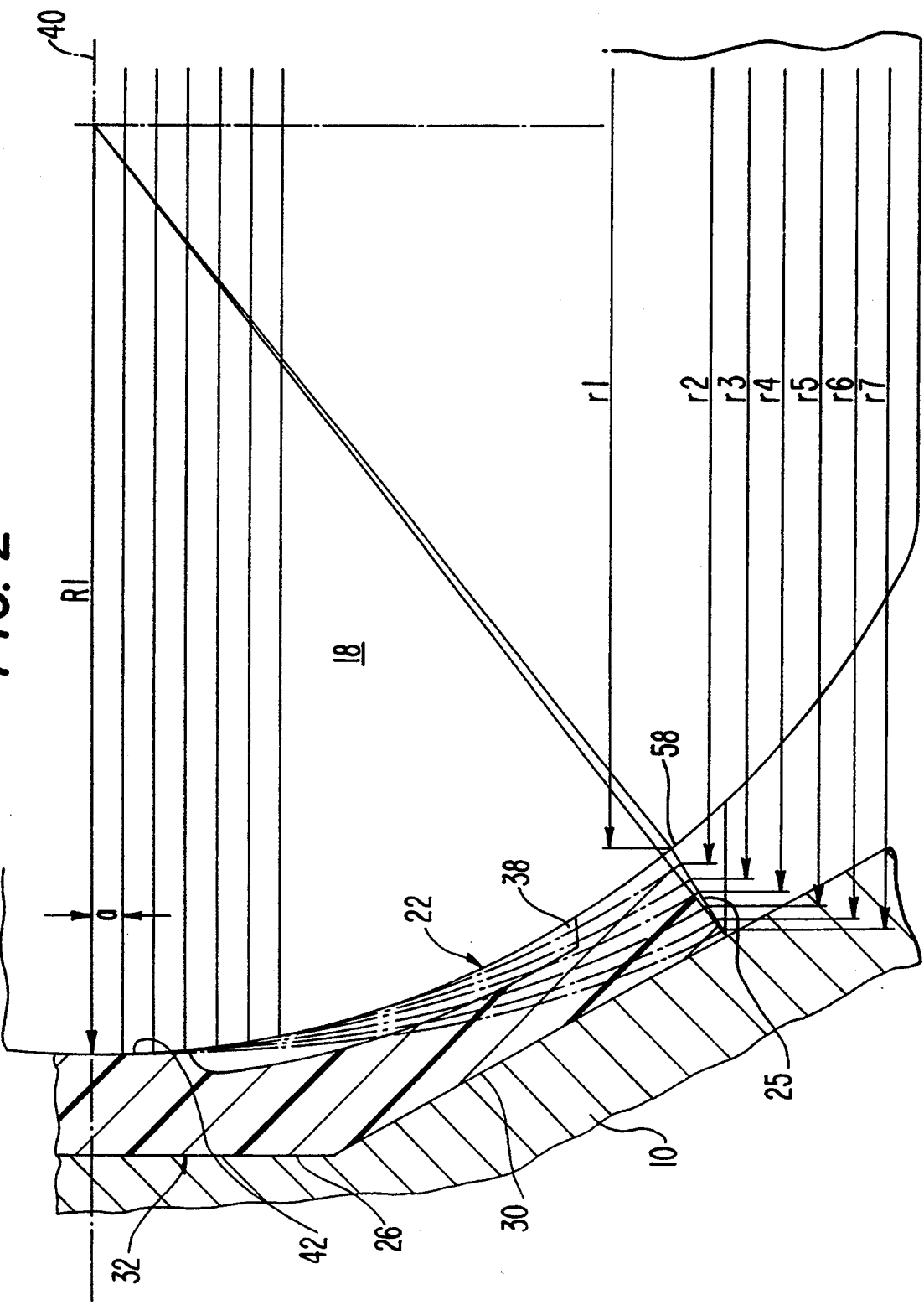
FIG. 2 is an enlarged cutout cross-section of the portion indicated by a dot-and-dash circle in FIG. 1.

As shown in FIG. 2, the wear-related abrasion of the bearing shell 22 on the inner annular edge 58 of its shell orifice 25 results due to its conicity, in an increase in the spherical-head friction radius r1 to r2. The equatorial diameter 40 of the spherical head 18 necessarily is displaced downwardly within the bearing shell 22 by the amount a. However, the equatorial friction radius R1 of the spherical head 18 remains constant.

As is evident from the representation of the increasing lower spherical-head friction radii r3 to r7 and the respective displacements proportional to wear of the equatorial friction radius R1 in the axial direction of the flanged bush 32, the supporting portion of the inner circumferential surface of the bearing shell 22 supporting the spherical head 18 below its equatorial plane is virtually maintained. As seen in the projection onto a plane perpendicular to the axis of the joint pin 20, however, the amount of this supporting portion decreases constantly with an increase in bearing-shell wear or an increase in the diameter of the bearing-shell orifice 25. Accordingly, despite a progressive abrasion of the bearing shell 22, the moment of friction is essentially maintained because the surface pressure decreases at the same time.

By variation of the conicity of the shell orifice 25 and starting from the same orifice diameter, it is also possible to determine arithmetically a desired wear-dependent trend of the moment of friction (i.e., a characteristic trend) in order to optimize the friction. Thus, by an appropriate choice of the radial prestress of the bearing shell 22 and of the diameter of its orifice 25, the amount of a moment of friction can be determined in a specific way over the lifetime of the ball joint for a maximum supporting force to be absorbed, without the ball joint having to be prestressed for this purpose such that a breakaway moment has to be overcome in order to pivot the joint pin 20.

Figure 3:
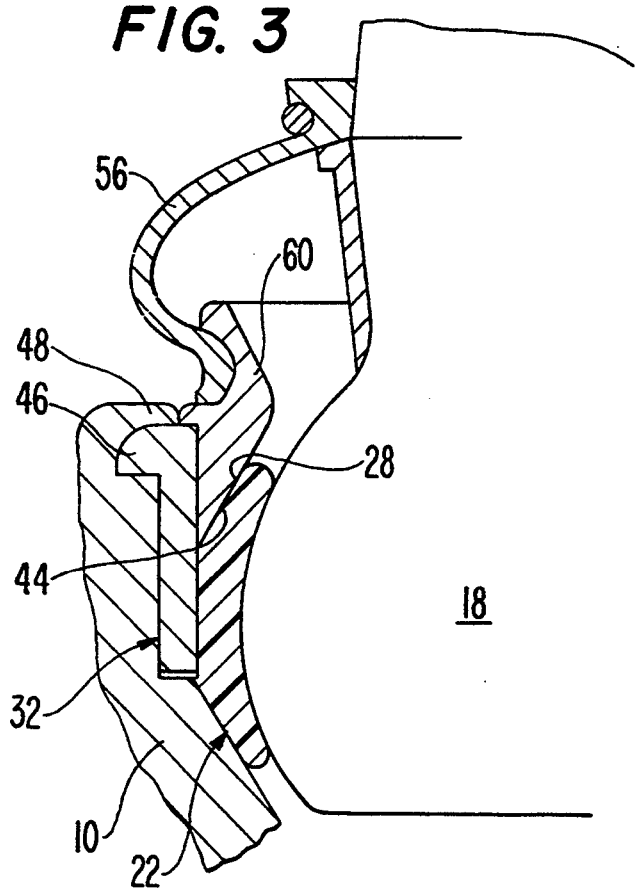
FIGS. 3 and 4 are partial sectional views through other embodiments of ball joints illustrating constructional alternatives of the flanged bush receiving the bearing shell.

In the embodiment of the flanged bush 32 shown in FIG. 3, the annular collar designated generally by numeral 60 is a plastic shaped body which is formed onto the bush 32. The conical circumferential-surface portion 28 of the bearing shell 22 is supported on the collar 60 and the sealing sleeve 56 is vulcanized on the latter.

Figure 4:
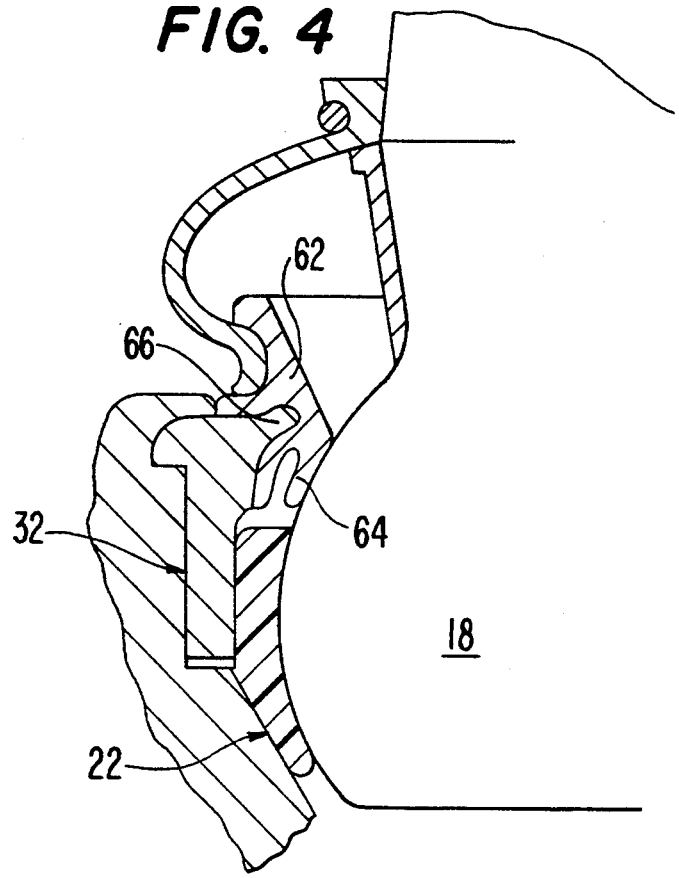

The further embodiment according to FIG. 4 also shows a plastic shaped body 62 which constitutes the annular collar and is formed onto the flanged bush 32 and which is equipped with elastically flexible retaining segments 64 which engage positively over the spherical head 18. The segments 64 allow an axially reduced design of the bearing shell 22. In order, at the same time, to increase safety against the joint pin 20 being pulled out of the housing recess 16, the flanged bush 32 is equipped on the inner circumference with an inner shoulder 66 which is encased by the shaped body 62 and the inside diameter of which is smaller than that of the spherical head 18.

The combination of a bearing shell 22 with a slot 24 extending transversely relative to the circumferential direction and with an axially central cylindrical circumferential portion 26 and conically narrowing circumferential portions 28, 30 adjoining the latter on both sides provides a ball-joint construction adjustable in its prestress and therefore also in respect of its coefficients of friction, when the axial mounting for the bearing shell 22 is determined in a specific way in terms of its axial clamping force. This is achieved, according to the present invention, in that the flanged bush 32 serving at the same time as the retaining member is limited in a specific way in its axial displacement relative to the bearing shell 22 by way of an axial stop. In the embodiments illustrated, this stop is formed by the outer flange 46 which is supported on a shoulder of the joint housing and which is fixed by the crimped housing collar 48. It is especially advantageous if the counterface of the cylindrical circumferential surface of the bearing shell 22 is also assigned to the flanged bush 32. For that purpose, the flanged bush 32 is provided with an axial neck penetrating into the housing 22 of the joint.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A ball joint for motor vehicle steering parts and wheel suspension parts, comprising a housing having first and second conical tapering inner wall portions, a plastic bearing shell fitted in the housing, and a joint pin having a spherical head operatively received in the plastic bearing shell, wherein the plastic bearing shell is divided by a slot extending at an angle to an equatorial plane of the plastic bearing shell, which plane is located transversely to a cylindrical outer wall portion of the shell between first and second conical tapering outer walls of the shell and is flexible in a radial direction of the spherical head, the housing has a cylindrical receiving inner wall portion located between the first and second conical tapering inner wall portions and in an area of the equatorial plane of the shell and is configured to mate with the cylindrical outer wall portion of the shell, a bush is press-fitted into the cylindrical receiving inner wall portion of the housing so as to brace the shell against the first conical tapering inner wall portion of the housing, which first conical tapering inner wall portion of the housing is more remote from the joint pin than is the second conical tapering inner wall portion and is configured to receive the first conical tapering outer wall portion of the plastic bearing shell and which second conical tapering inner wall portion is arranged on the bush and is configured to receive the second conical tapering outer wall portion of the shell, and the bush is provided with a flange arranged to limit the depth to which the bush is inserted into the housing and configured to be fixed relative to the housing by a flanged wall area of the housing.

2. The ball joint according to claim 1, wherein the bearing shell has a bearing-shell orifice which narrows conically in a radially inward direction and into which the spherical head engages, and, with a maximum deflection of the joint pin, the bearing-shell orifice maintains support of the spherical head of the joint pin.

3. The ball joint according to claim 1, wherein the first tapered conical wall portion of the bearing shell projects beyond the bush.

4. The ball joint according to claim 1, wherein the bush has an annular collar onto which a sealing sleeve enclosing the joint pin is vulcanized.

5. The ball joint according to claim 4, wherein the first tapered conical wall portion of the bearing shell projects beyond the bush.

6. The ball joint according to claim 4, wherein the annular collar is a plastic body formed onto the bush and has the second tapered conical portion.

7. The ball joint according to claim 4, wherein the annular collar has flexible retaining segments on an inner circumference thereof to engage positively over the spherical head and to be elastically flexible in a radial direction of the spherical head.

8. The ball joint according to claim 7, wherein the bush has an inner shoulder encased by the annular collar and is sized such that an inside diameter thereof is smaller than the diameter of spherical head.

9. The ball joint according to claim 1, wherein the bearing shell has pocket-like depressions distributed over the shell circumference on both sides of the equatorial diameter of the spherical head for receiving a lubricant.

10. The ball joint according to claim 9, wherein the bush has an annular collar onto which a sealing sleeve enclosing the joint pin is vulcanized.

11. The ball joint according to claim 10, wherein the annular collar is a plastic body formed onto the bush and has the second tapered conical portion.

12. The ball joint according to claim 10, wherein the annular collar has flexible retaining segments on an inner circumference thereof to engage positively over the spherical head and to be elastically flexible in a radial direction of the spherical head.

13. The ball joint according to claim 12, wherein the bush has an inner shoulder encased by the annular collar and is sized such that an inside diameter thereof is smaller than the diameter of spherical head.

* * * * *